United States Patent [19]

Brown

[11] Patent Number: 4,798,850

[45] Date of Patent: Jan. 17, 1989

[54] BLENDED-FIBRE FILTER MATERIAL

[75] Inventor: Richard C. Brown, Dore, England

[73] Assignee: National Research Development Corporation, London, England

[21] Appl. No.: 43,205

[22] Filed: Apr. 27, 1987

[30] Foreign Application Priority Data

May 19, 1986 [GB] United Kingdom ............... 8612070

[51] Int. Cl.$^4$ .............................................. C08L 9/00
[52] U.S. Cl. .................................. 521/134; 521/138; 521/139; 521/142; 428/394; 428/398; 210/348; 210/500.1; 210/500.23; 210/500.35; 210/500.36; 210/500.43; 264/41; 264/45.3; 264/46.1
[58] Field of Search ............... 521/134, 138, 139, 142; 210/348, 500.1, 500.23, 500.35, 500.36, 500.43; 264/41, 45.3, 46.1; 428/394, 398

[56] References Cited

U.S. PATENT DOCUMENTS

| 3,595,721 | 7/1971 | Hamano et al. ............... 156/148 |
| 3,904,798 | 9/1975 | Vogt et al. ............... 428/218 |
| 4,291,087 | 9/1981 | Warburton, Jr. ............... 428/290 |
| 4,670,341 | 6/1987 | Lundsager ............... 428/394 |

FOREIGN PATENT DOCUMENTS

| 384052 | 12/1932 | United Kingdom . |
| 1188322 | 4/1970 | United Kingdom . |
| 1446570 | 8/1976 | United Kingdom . |
| 1484492 | 9/1977 | United Kingdom . |
| 2086954 | 5/1982 | United Kingdom . |

OTHER PUBLICATIONS

R. C. Brown, "Air Filters Made from Mixtures of Electrically Charged Fibres", Electrical and Magnetic Separation and Filtration Technology, Antwerp Conf., paper 23-25, May 1984 (vol. 6, pp. 117-122).

Primary Examiner—Maurice J. Welsh
Assistant Examiner—Samuel A. Acquah
Attorney, Agent, or Firm—Nixon & Vanderhye

[57] ABSTRACT

A filter material is a felt of 60 weight % 2.8 decitex polypropylene fibres and 40 weight % of 3.5 decitex modacrylic fibres.

16 Claims, No Drawings

BLENDED-FIBRE FILTER MATERIAL

This invention is a filter material of blended fibres. The filter material may find application in dust helmets, respirators, suction cleaners and air-conditioning systems as a disposable filter element, and even as a duster.

In air filters, a low resistance to air flow is desirable, coupled with, of course, a high filtration efficiency (=a high probability that a particle borne in the air flow through the filter will be captured by the filter). These properties can be met by a filter material having an open structure but carrying electric charge, to attract dust particles. Such a filter material is described in British Patent Specification No. 384052, wherein wool fibres are carded with resin particles. In this filter material, the action during manufacture of rubbing the wool against the resin imparts a persistent negative charge to the resin and an induced positive charge to the wool. These charges attract dust particles.

It would be desirable to find an air filter with a high filtration efficiency, which is reasonably priced, which has a low resistance to air flow and which is non-flammable.

According to the present invention, a filter material comprises a blend of (i) clean polyolefine fibres and (ii) clean fibres of a substituted addition polymer, preferably a polymer comprising one or more substituted hydrocarbons; the substituent may be —CN or a halogen (preferably fluorine or chlorine), and the hydrocarbon may be a polyolefine, preferably polyethylene or polypropylene. The fibres (ii) could thus contain for example one or more of chloroethylene units, for example —CHCl—CH$_2$— or —CCl$_2$—CH$_2$—, or acrylonitrile units —CH$_2$—C(CN)H—, or tetrafluoroethylene units —CF$_2$—CF$_2$—, and could thus be for example acrylic, polyvinyl chloride, polyvinylidene chloride, vinyl chloride-vinylidene chloride copolymer, chlorinated polyvinyl chloride, polytetrafluoroethylene or (preferably) modacrylic. By "clean" we mean that the fibre has no coating of lubricant or anti-static agent, or that any such coating was removed before blending, for example by scouring with a non-ionic detergent. By "modacrylic" we mean a copolymer comprising from 35 to 85 weight percent acrylonitrile units and preferably having the balance made up substantially of other addition-polymer-forming units, preferably vinyl ester or halogenated hydrocarbon such as vinyl chloride or vinylidene chloride.

The polyolefine fibres (i) may be polyethylene, ethylene-propylene copolymer, or (preferably) polypropylene.

The modacrylic is preferably Kanekalon (trade mark) by Kanegafuchi Chem. Co. and Kanekalon Co. of Japan or Teklan (trade mark) by Courtaulds. Kanekalon comprises 55 weight % vinyl chloride. Teklan comprises 50 weight % of vinylidene chloride and under 2 weight % of a third monomer for providing dye sites. The balance in both cases is substantially acrylonitrile. The modacrylic preferably comprises at least 40, more preferably at least 44, most preferably at least 50 weight % acrylonitrile.

The ratio of fibre (i) to fibre (ii) is preferably from 30:70 to 80:20 by surface area, more preferably from 40:60 to 70:30.

The fibres are preferably finer than 100 micrometers, preferably from 10 to 25 micrometers and preferably the fibre (i) cross-sectional area does not differ from the fibre (ii) crosssectional area by more than a factor of 3. Staple length is preferably from 30 to 200 mm, more preferably 40 to 100 mm. The fibres (i) or (ii) or both are preferably crimped.

Preferably the material is a felt, preferably made by carding the fibres into a fleece and needling them. The carding is preferably performed by passing the material over a conventional two-swift card, or to substantially the equivalent extent by any alternative means. (The carding is likely to impose a practical limit on the fineness of usable fibres. The finer the fibres, the more efficient the filter but the higher the resistance to air flow.) The carding step must not be allowed to contaminate the fibres with anti-static agent or lubricant.

The invention will now be described by way of example.

The filter material is a mixture of two different crimped synthetic polymer fibres carded into a fleece and then needled to form a felt. The fibres are well mixed, and they became electrically charged during carding. The electric charge that they hold is critical in effecting the capture of small dust particles by the material.

The first fibre is polypropylene 20 micrometers thick, which in commerce is 2.8 decitex (n tex=n g/km). This may be e.g. round or trilobal. Polypropylene from various manufacturers has been tried, and found to be fairly consistent. Pigmented polypropylene is acceptable. Commercially produced polypropylene fibres normally have on them a "spin finish", which is a mixture of lubricant and anti-static agent. Polypropylene can be made finish-free quite easily, but usually it is not. This finish is removed before the fibres are carded. Any of the usual processes of textile scouring could be used, such as detergent, alkali or solvent scouring; scouring with a non-ionic detergent is quite effective provided it is thorough. If the fibres are moderately clean the filter will be moderately good. Then the fibre is well rinsed.

The second fibre is modacrylic 18 micrometers thick, in particular Teklan (described above) of 3.5 decitex. Dyed modacrylic fibre is acceptable but undyed modacrylic fibre is preferred. Commercial modacrylic fibre cannot in practice be made without a "spin finish", which (as with polypropylene) is a mixture of lubricant and antistatic agent. This finish is removed before the fibres are carded. Any of the usual processes of textile scouring could be used, such as detergent, alkali or solvent scouring; scouring with a non-ionic detergent is quite effective provided it is thorough. If the fibres are moderately clean the filter will be moderately good. Some benefit may be obtained from an alkali scour or chemical leaching. Acid scouring is not recommended.

These fibres are carded using a two-swift card, each swift having four worker-stripper units, in weight proportions 60 polypropylene:40 modacrylic, i.e. to give surface areas roughly in the ratio 2:1, polypropylene:-modacrylic, into a fleece. The carding causes both fibres to acquire electric charge, which, after falling during the next day, thereafter remains at a fairly constant level for several months. The fleece has a mass of 1.5 kg per square meter.

The fleeces are lightly needled, using a needle-punching loom, at 8 mm penetration, 25 needlings/cm$^2$, to form a felt. Depending on the end use, where a stiffer or denser felt is wanted, heavier needling may be preferable.

The fibre processing machines (i.e. card and needle-loom) are kept clean to avoid contaminating the fibres, especially with spin finish from previous batches. Although not strictly essential, preferably all-metal card clothing is used, and if the needle-loom has boards with wooden backs, a new board should be used. Card clothing is usually contaminated with oil, and this must be removed.

The fibres may be (coarsely) mixed using a blender before the carding. The blender should likewise be kept clean. The carding completes the mixing, but it this is inadequate laterally across the fleece, a cross-laying stage can be interposed between the swifts, as is known practice.

The resulting filter material has low flammability, and may find use in dust helmets, disposable respirators and elsewhere.

The performance of the filter depends on its packing fraction (proportion of its volume occupied by fibres). Thus, the penetration of aerosols in general decreases (i.e. the filter is more effective) and the pressure drop increases (i.e. air flow is more impeded) as the packing fraction is increased at constant filter mass per unit area.

At a given packing fraction and mass per unit area, filters made from finer fibres are more effective than those made from coarser, but they also have a higher resistance to airflow. The choice of fibre diameter is finally governed by the purpose for which the filter is intended, but it is likely that the most useful will be made from the finest fibres that can be carded without any difficulty.

A 'standard' aerosol (to B.S. 4400 of 1969) at a fixed filtration velocity (0.28 m s$^{-1}$) was used on filters according to the invention, on polypropylene/wool filters, and on filters made entirely from polypropylene, the respective filters being matched in a first series of comparative tests as regards pressure drop across them (100 Pa at the filtration velocity), and being matched in a second series as to mass per unit area (1.5 kg m$^{-2}$).

In the first series of tests (constant pressure drop), the penetration of the 'standard' aerosol was 0.07% through the filter of the invention, 0.40% through the polypropylene/wool filters, and 10.2% through the pure polypropylene filter. In the second series of tests (constant filter mass per unit area), the penetration of the 'standard' aerosol through the filter of the invention was 0.032%, through the polypropylene/wool filter was 0.31% and through the pure polypropylene filters was 7.0%.

In a further test, the filter of the invention was encapsulated in a plastic filter cartridge of a type normally used in approved respirators. The cartridge was a short cylinder of approximately 13 mm depth and 70 mm diameter. The filter was subjected to a test conforming in all essential features to that part of the British Standard BS 2091 test for respirators which comprises measurement of 'standard' aerosol penetration at a volume flow rate of 30 liters/minute through the filters, and measurement of the pressure drop across the filter at a flow rate of 85 liters/minute through the filter.

According to the Standard, a filter is rated as Class A if the aerosol penetration is no greater than 10% and the pressure drop is no greater than 200 Pa, and it is rated as Class B if the penetration in no greater than 2% (different criteria are applied to filters of different types; 2% penetration is applied to resin wool filters; it is the most rigorous and the most appropriate for the filter of the invention) and the pressure drop no greater than 320 Pa.

1.5 g of the material of the invention encapsulated in this way gave a penetration of 0.9% and a pressure drop of 63 Pa, and 3.0 g of the material of the invention so encapsulated gave a penetration of 0.3% and a pressure drop of 190 Pa. Both filters thus satisfied each class of the Standard.

Sufficient time has not elapsed for the stability of the charge on the filters described above to be conclusively established, but from previous experience it is considered that a substantial increase in aerosol penetration is likely in the first 24 hours after manufacture, followed by a much slower increase. Penetration may double in the first 24 hours; from the 24 hour value it may increase by a factor of 1.5 in one month and 1.7 in one year. The filters used in the previous comparison tests were all therefore at least one day old.

What is claimed is:

1. A filter material which comprises a blend of (i) clean polyolefine fibers and (ii) clean fibers of an addition polymer comprising one or more halogen-substituted hydrocarbons.

2. A filter material according to claim 1, wherein said halogen substituted hydrocarbon is a halogen-substituted polyolefine.

3. A filter material according to claim 2, wherein said halogen-substituted polyolefine is selected from halogen-substituted polyethylene and halogen-substituted polypropylene.

4. A filter material according to claim 2, wherein the fibers (ii) contain one or more units selected from chloroethylene units and tetrafluoroethylene units.

5. A filter material according to claim 4, wherein the fibers (ii) are selected from polyvinyl chloride, polyvinylidene chloride, vinyl chloride-vinylidene chloride copolymer, chlorinated polyvinyl chloride and polytetrafluoroethylene.

6. A filter material according to claim 5, wherein the fibers (ii) are halogen-substituted modacrylic.

7. A filter material according to claim 1, wherein the ratio of fiber (i) to fiber (ii) is from 30:70 to 80:20 by surface area.

8. A filter material according to claim 7, wherein the ratio of fiber (i) to fiber (ii) is from 40:60 to 70:30 by surface area.

9. A filter material according to claim 1, wherein the fibers are finer than 100 micrometers.

10. A filter material according to claim 9, wherein the fiber diameters are from 10 to 25 micrometers.

11. A filter material according to claim 1, wherein the fiber (i) cross-sectional area does not differ from the fiber (ii) cross-sectional area by more than a factor of 3.

12. A filter material according to claim 1, wherein the fiber staple length is from 30 to 200 mm.

13. A filter material according to claim 12, wherein the fiber staple length is from 40 to 100 mm.

14. A filter material according to claim 1, wherein the fibers (i) or (ii) or both are crimped.

15. A filter material according to claim 1, in the form of a felt.

16. A filter material according to claim 15, wherein the felt is made by carding the fibers into a fleece and needling them.

* * * * *